United States Patent
Lehman et al.

(10) Patent No.: US 7,386,997 B2
(45) Date of Patent: Jun. 17, 2008

(54) SYSTEM FOR AND METHOD OF BATCH ANALYSIS AND OPTIMIZATION FOR GLASS MANUFACTURING

(75) Inventors: Richard L. Lehman, Princeton, NJ (US); Warren Blasland, Jr., Wellington, FL (US)

(73) Assignee: Culchrome, LLC, Charlotte, NC (US)

( * ) Notice: Subject to any disclaimer, the term of this patent is extended or adjusted under 35 U.S.C. 154(b) by 339 days.

(21) Appl. No.: 10/988,019

(22) Filed: Nov. 12, 2004

(65) Prior Publication Data
US 2006/0101857 A1    May 18, 2006

(51) Int. Cl.
C03C 6/02    (2006.01)
C03C 4/02    (2006.01)

(52) U.S. Cl. ............... 65/28; 65/29.11; 65/29.16; 65/29.18; 65/158; 65/160; 65/134.1; 65/135.9; 700/157

(58) Field of Classification Search .......... 65/28, 65/29.12, 29.16, 158, 160, 134.3, 134.8, 65/29.11, 29.18, 134.1, 135.9, 335; 209/522, 209/580, 930; 700/157
See application file for complete search history.

(56) References Cited

U.S. PATENT DOCUMENTS

| | | | | |
|---|---|---|---|---|
| 4,187,775 A | | 2/1980 | Flender | 100/39 |
| 4,252,551 A | | 2/1981 | Mishimura | 65/28 |
| 4,347,073 A | | 8/1982 | Aubourg et al. | 65/28 |
| 5,399,181 A | | 3/1995 | Sorg | 65/27 |
| 5,524,855 A | | 6/1996 | Lesar | 248/530 |
| 5,588,978 A | | 12/1996 | Argent et al. | 65/29.1 |
| 5,663,997 A | * | 9/1997 | Willis et al. | 378/45 |
| 5,718,737 A | * | 2/1998 | Mosch | 65/30.1 |
| 5,741,342 A | | 4/1998 | Alexander | 65/136.1 |
| 5,894,938 A | * | 4/1999 | Ichise et al. | 209/559 |
| 6,144,004 A | * | 11/2000 | Doak | 209/581 |
| 6,230,521 B1 | | 5/2001 | Lehman | 65/29.11 |
| 6,504,124 B1 | | 1/2003 | Doak | 209/581 |
| 6,748,883 B2 | | 6/2004 | Solis-Martinez | 110/347 |

FOREIGN PATENT DOCUMENTS

| | | |
|---|---|---|
| DE | 10042268 C1 | 1/2002 |
| EP | 0 709 138 A2 | 5/1996 |
| JP | 2001-58846 | 3/2001 |

OTHER PUBLICATIONS

Dalmijn, W.L. et al., "Glass Recycling", *Third International Symposium on Recycling of Metals and Engineered Materials*, 1995, 993-1011, XP008058398.

* cited by examiner

*Primary Examiner*—Eric Hug
(74) *Attorney, Agent, or Firm*—Woodcock Washburn LLP

(57) ABSTRACT

Certain preferred embodiments of the present invention provide a system for and method of analyzing and cleaning a cullet stream prior to bottle manufacturing. In accordance with certain aspects of the present invention, the system includes a raw materials feeder, a mixing stage, a melting stage, a bottle-forming stage, a cooling/annealing stage, an inspection stage, and a batch controller. The raw materials feeder further includes a cullet bin within which is cullet supply, a feeder, an analysis device, and removal assembly. Certain preferred embodiments of the method include the steps of feeding cullet onto the conveyor, performing real-time composition analysis of the cullet, removing contaminants from the cullet, determining whether the cullet batch is consistent with a predetermined tolerance threshold, adjusting the glass batch formulation, sending the batch ingredients to the mixing stage, and then completing the overall glass manufacturing process.

40 Claims, 3 Drawing Sheets

SYSTEM FOR AND METHOD OF BATCH ANALYSIS AND OPTIMIZATION FOR GLASS MANUFACTURING

FIELD OF THE INVENTION

The present invention relates to the field of glass production. More particularly, the present invention relates to a system and method of determining the composition of mixed-color glass cullet and optimizing the quality of glass batch formulations.

BACKGROUND OF THE INVENTION

Cost-effective recycling of materials, such as glass, has become an increasingly important issue because of stresses on the environment and scarcity of resources. Concern about these issues has prompted governmental involvement, including the establishment of governmental guidelines, e.g., "bottle bills." Because of governmental requirements and environmental awareness, American consumers are now recycling at a greater rate than ever before.

Increased recycling of materials reduces the amount of materials, such as glass, plastics, paper, etc. that enters land fills or other waste-disposal points. Additionally, recycling significantly reduces the need for manufacturers to use "virgin" materials, and thus preserves environmental resources. Further, the use of recyclables in place of virgin raw materials often reduces energy requirements, eliminates process steps, and reduces waste streams, including air emissions during product manufacturing. For example, recycled glass requires less energy and emits fewer contaminants during the glass manufacturing process than virgin raw materials do. Many states have placed demands on glass manufacturers that require new glass bottles to contain a minimum percentage of recycled glass. For example, in Oregon, glass container manufacturers are required to use at least 35% post-consumer cullet, which is broken pieces of glass. California has even more aggressive laws requiring glass manufacturers to increase use of recycled content to 65% by 2005.

However, there are associated issues of complying with these governmental mandates. Prohibitive sorting costs have made it difficult for suppliers to process an adequate quantity of single-colored recycled glass. Often, the glass coming into a material recovery facility (MRF) and/or a glass processing facility, e.g., a site where cullet is cleaned and prepared for shipment to glass manufacturers, is broken, contaminated with other materials, and of mixed color. Such material was previously unusable for glass manufacturing and was used in low value applications or simply placed in a landfill. Currently, however, regulatory requirements and other issues are forcing glass manufacturers to increase the amount of mixed cullet used in their furnaces which, in turn, has established the need to use mixed cullet in the manufacture of glass.

Generally, fewer problems exist when recycling clean sources of glass cullet that are of the same composition as products being manufactured. However, since most cullet is derived from consumer waste, the main issue is how well-segregated the different glass waste streams are, and the consequent level of contamination. Foreign material such as ceramics (such as pottery and china, from restaurants and/or bars); stones, gravel and/or dirt (from poor storage of cullet); ferrous metals (from bottle tops and other scrap); non-ferrous metals (lead foils from wine bottles or aluminum bottle caps); and organics (labels and excessive food residue) can all render a batch of cullet unusable.

In the glass-making process, non-ferrous metals can give rise to higher emissions, or can settle out as a layer at the base of the glass furnace. Ceramics may not be incorporated into the melt, and although organics will burn off in most furnaces, they create offensive odor and may present a problem in the crushing machinery used to produce the cullet. Thus, cullet quality and the levels of contamination are of major concern. It would be beneficial to develop a process for reusing mixed colored glass, wherein mixed cullet is used like color-sorted cullet, to make new and useful glass products.

Glass manufacturers are especially concerned about the quality of glass supplied from post-consumer streams. With glass batch formulations now able to contain increased amounts of mixed cullet (e.g., glass of mixed colors, typically green, amber, and flint/clear), the mixed cullet or single-colored glass received by glass manufacturers should consistently meet the specifications given by the suppliers. Glass manufacturers rely upon these specifications, which specify glass compositions and levels of impurities, to develop a glass batch recipe or formulation for manufacturing bottles.

Generally, the glass making operation is a continuous batch process where the cullet is melted and subsequently dissolved with other raw materials necessary to achieve the required final glass composition. The addition of colored cullet affects, amongst other processing variables, the absorptivity of the mixture and the rate at which it melts. Thus, each batch may require a different formulation of raw materials to achieve the desired final glass composition and consistent end product quality. Unfortunately, the supplied specifications may not be accurate, and glass manufactures often have to "guesstimate" batch formulations. For example, "pure" amber cullet from a processor may contain five or ten percent of other colors and impurity specifications for ceramic and organic contamination may be vague approximations. Any discrepancy between the specifications listed and the actual composition of the supplied glass results in glass that is not uniform in color compared to other glasses manufactured from different batches. This practice has been tolerated by the glass industry as long as cullet use levels were low. As cullet use levels increase, there is a need to reduce or eliminate variability, including both intra-batch and batch-to-batch variability, to ensure that the color of glass manufactured from the formulations is uniform. Thus, real-time analysis of mixed-cullet composition as it is introduced into the glass manufacturing process would be beneficial in ensuring uniformity of the as-manufactured glass bottles.

One method of using mixed colored cullet for glass manufacturing is described in U.S. Pat. No. 5,718,737, entitled, "Method of recycling mixed colored cullet into amber, green, or flint glass." The '737 patent, herein incorporated by reference, describes how mixed colored cullet glass is recycled into amber colored glass by regulating the additive amounts of amounts of iron, carbon, sulfur, and sulfur compounds in the mixture to impart the desired reddish-brown hue. While the '737 patent provides a suitable method of using mixed colored cullet for glass manufacturing, it does not address the variability within the batch formulations as a result of the variations in the cullet supply. Nor does the '737 patent provide real-time analysis of the composition of mixed cullet as it is introduced into the glass manufacturing process in order to ensure end-product uniformity.

U.S. Pat. No. 6,230,521, entitled, "Method of recycling batches of mixed color cullet into amber, green, or flint glass with selected properties," herein incorporated by reference, describes an automated method for recycling mixed colored cullet glass into new glass products. A computer-controlled process identifies the virgin glass raw materials, the desired target glass properties, the composition of a batch of mixed colored cullet, and the quantity of cullet to be used in the glass melt. The computer controlled process automatically determines the proper amounts of raw materials to add to the batch of mixed colored cullet so that recycled glass is produced that has the desired coloring oxides, redox agents, and glass structural oxides in the proper proportion. While the '521 patent provides a suitable method of recycling mixed color cullet glass into new glass products, it does not provide a way to remove impurities from the cullet within the glass manufacturing process prior to being introduced within the glass batch. One method of identifying cullet composition is provided by U.S. patent application Ser. No. 10/988,018, entitled "Method of Analyzing Mixed-Color Cullet to Facilitate Its Use in Glass Manufacture," herein incorporated by reference.

Mixed cullet is processed and cleaned by entities, such as an MRF and/or a cullet processor, before it is shipped to a glass manufacturer. However, the supply of mixed cullet still often contains residual contaminants, such as ceramics and other impurities, that have escaped the cleaning process. The color composition of mixed color cullet depends on municipal sources and will vary over some time period and may or may not be reflected in supplier specifications when the glass is shipped to the glass manufacturer. These impurities within the mixed cullet are a serious concern to glass manufacturers and contribute to inconsistent quality and color of manufactured glass if adjustments to the batch formulation are not made.

There exists a need in the art for a method of ameliorating compositional variations within glass batch formulations. In order to further optimize the cullet and glass batch quality, there also exists a need in the art for a method and apparatus for further removing impurities from the cullet within the glass manufacturing process immediately prior to the cullet being introduced within the glass batch melt.

SUMMARY OF THE INVENTION

Certain aspects of the present invention provide a method of determining the constituents and impurities in mixed-color cullet to facilitate its use in glass manufacture. More specifically, the method of the present invention determines the constituents and impurities in cullet, such as, but not limited to, three-color mixed cullet. However, mixed-color cullet may likewise include two-, four-, or five-color mixed cullet, within which there is no one predominant color of 90% or more. Certain preferred embodiments of the present invention disclose a system for and method of composition-analysis of cullet constituent particles using various analysis techniques that facilitate real-time adjustment of a glass batch formulation to compensate for any discrepancies between the measured mixed cullet composition and specifications provided by a mixed cullet supplier. Real-time, as used herein, may be understood to encompass the operating and response time of the glass batch manufacturing process. Thus, aspects of the present invention contemplate those situations of non-instantaneous operating and response times, as well as those situations were there is a time differential between the operating and response time of the process.

Further, the analysis techniques may directly determine composition, for example using X-ray or, infra-red, or Raman spectroscopy, or may predictively determine composition by comparison of physical characteristics such as, but not limited to, optical opaqueness/transmission, size, aspect ratio, shape, texture, etc. Thus, the analysis techniques may include use of an optical imaging system. The system for and method of the preferred embodiments of the present invention allow for real-time adjustment of the batch formulation, which allows glass manufacturers to consistently manufacture glass of uniform color and quality. Furthermore, the system and method of the present invention allows for a final cleaning of the mixed cullet to further enhance the cullet, and end product, quality.

A presently preferred embodiment of the invention utilizes an optical imaging device which is linked to a batch controller (e.g. computer controller) to provide real-time optical imaging analysis of supplied mixed cullet. The batch controller compares the measured composition of mixed cullet supply with a desired tolerance threshold, and makes any necessary real-time adjustments to the batch formulation to ensure that the end product is of consistent, uniform color and quality. The tolerance threshold may be the cullet supplier-provided specification. Alternatively, the tolerance threshold may be a preset or user-defined specification. The glass manufacturing system and method also allow for a final cleaning of mixed cullet supply via air jets to eliminate any residual contaminants, thereby further enhancing the quality of mixed cullet supply.

Certain preferred embodiments of the present invention disclose a method of creating recycled glass products by providing a supply of glass cullet, determining the constituents of the glass cullet prior to providing the cullet to a mixer, comparing the composition the glass cullet constituents to a desired tolerance threshold, and selectively diverting either glass constituents or impurity constituents that do not satisfy the threshold. The glass cullet is then mixed with raw materials to create a glass formulation, and recycled glass products, such as glass bottles, are then made from the formulation. Thus, certain preferred embodiments of the present invention reduce the time and expense of pre-separating cullet and remixing during glass manufacturing.

Another aspect of the present invention provides a glass cullet processing system having conveyor suitable to convey glass cullet, a feeder for feeding a supply of glass cullet to the conveyor, and an analyzer capable of determining glass cullet composition or color, or both, as the cullet passes the analyzer on the conveyor. Further, a diverting device selectively diverts those constituents that do not satisfy a threshold analysis so as to bring the conveyed glass cullet into compliance with a tolerance threshold for a desired glass composition. A mixer then mixes the glass cullet with raw materials to create a glass formulation for the desired glass composition.

DETAILED DESCRIPTION OF ILLUSTRATIVE EMBODIMENTS

The method of recycling mixed cullet with the above-mentioned beneficial features in accordance with the presently preferred embodiment of the invention will be described below with reference to FIGS. 1-3. It will be appreciated by one skilled in the art that the description given herein with respect to those figures is for exemplary purposes only and is not intended in any way to limit the scope of the invention.

A preferred embodiment of the present invention includes a system for and method of composition-analysis of cullet glass particles using optical imaging techniques that facilitate real-time adjustment of a glass batch formulation to compensate for any discrepancies between the measured mixed cullet composition and specifications provided by a mixed cullet supplier. Further, the system for and method of the present invention allows for real-time adjustment of the batch formulation, which allows glass manufacturers to consistently manufacture glass of uniform color and quality. The system and method of the present invention also allows for a final cleaning of the mixed cullet to further enhance the cullet quality.

The system and method of the present invention provides a computer controlled process that identifies virgin glass raw materials, the composition/constituents of a batch of mixed-color cullet, the desired target glass composition, and the quantity of cullet to be used in the glass melt, and the computer determines the proper amount of raw materials to add to the batch of mixed cullet so that the recycled glass is produced having the desired final composition. The recycled glass is then used to make glass products such as beer bottles.

Figure 1:
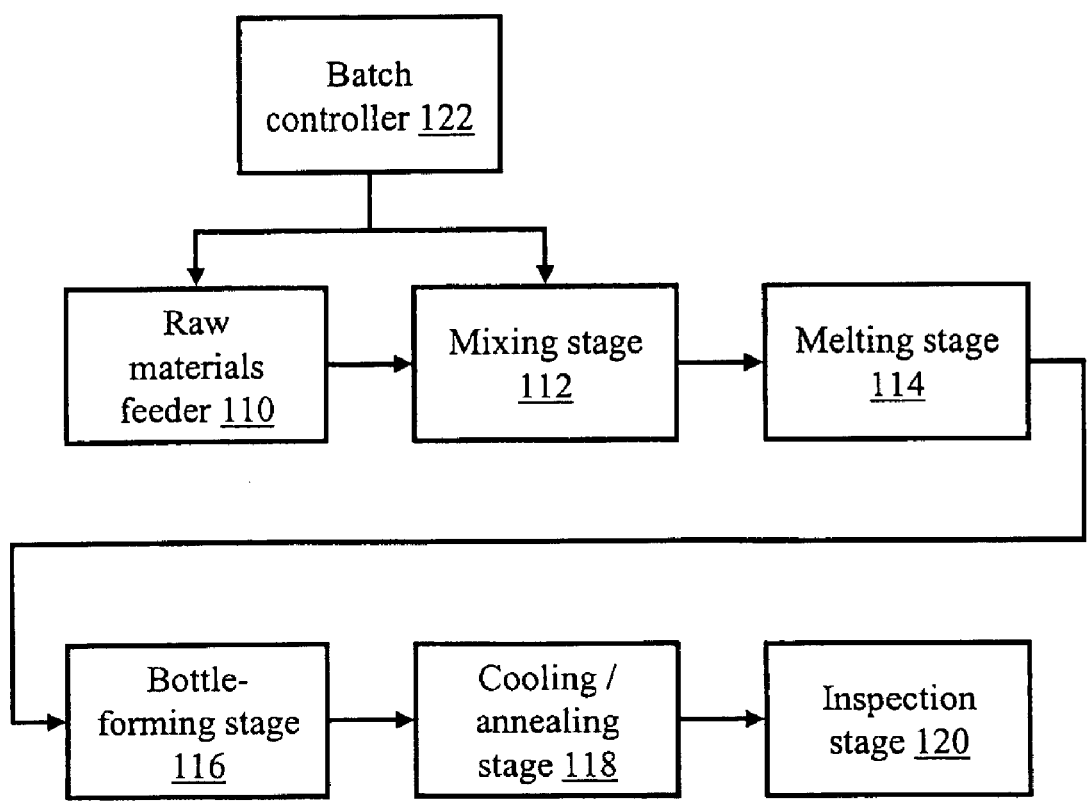
FIG. 1 illustrates a glass manufacturing system for manufacturing glass using mixed cullet, in accordance with the invention.

FIG. 1 illustrates a glass manufacturing system 100 for manufacturing glass using mixed cullet in accordance with the invention. Glass manufacturing system 100 includes a raw materials feeder 110, a mixing stage 112, a melting stage 114, a bottle-forming stage 116, a cooling/annealing stage 118, an inspection stage 120, and a batch controller 122 that controls the raw materials feeder 110 and the mixing stage 112.

Figure 2:
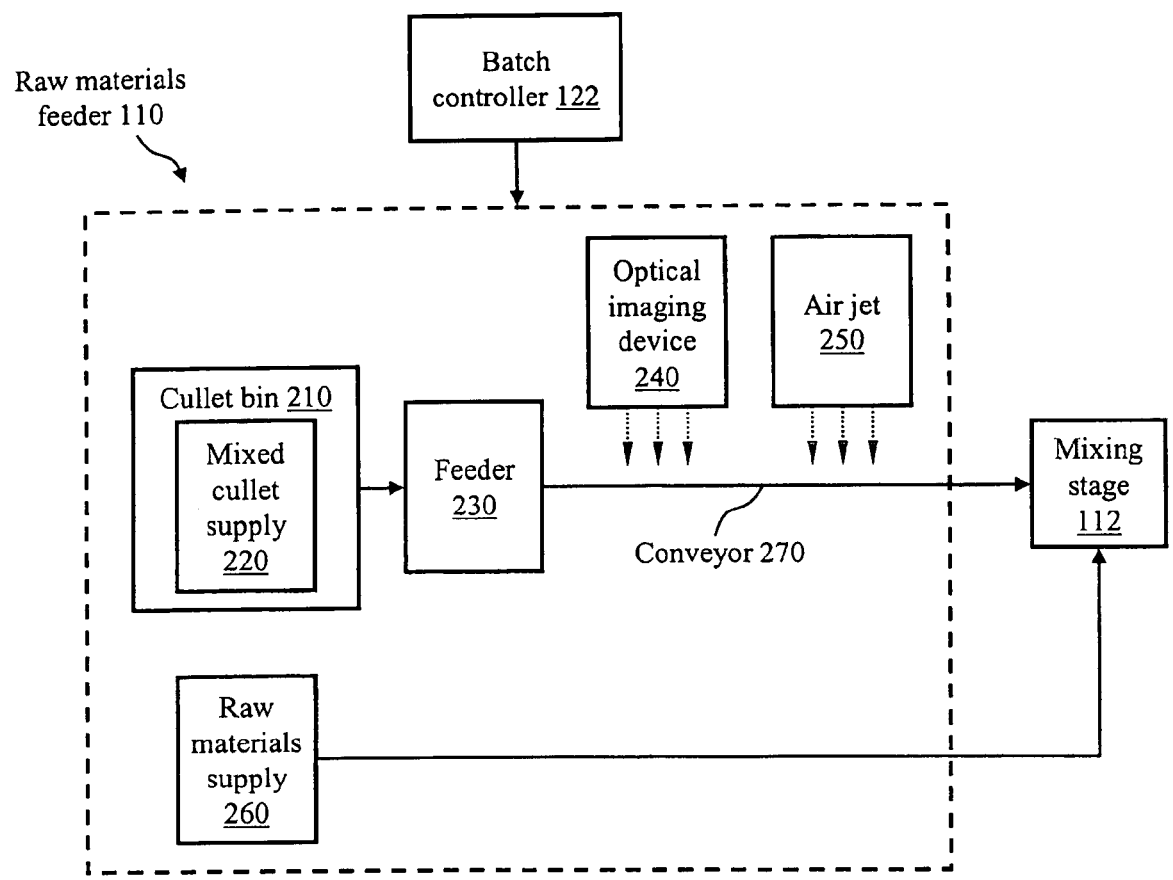
FIG. 2 illustrates elements within a raw materials feeder that are used to perform batch analysis and optimization, in accordance with the invention.
Figure 3:
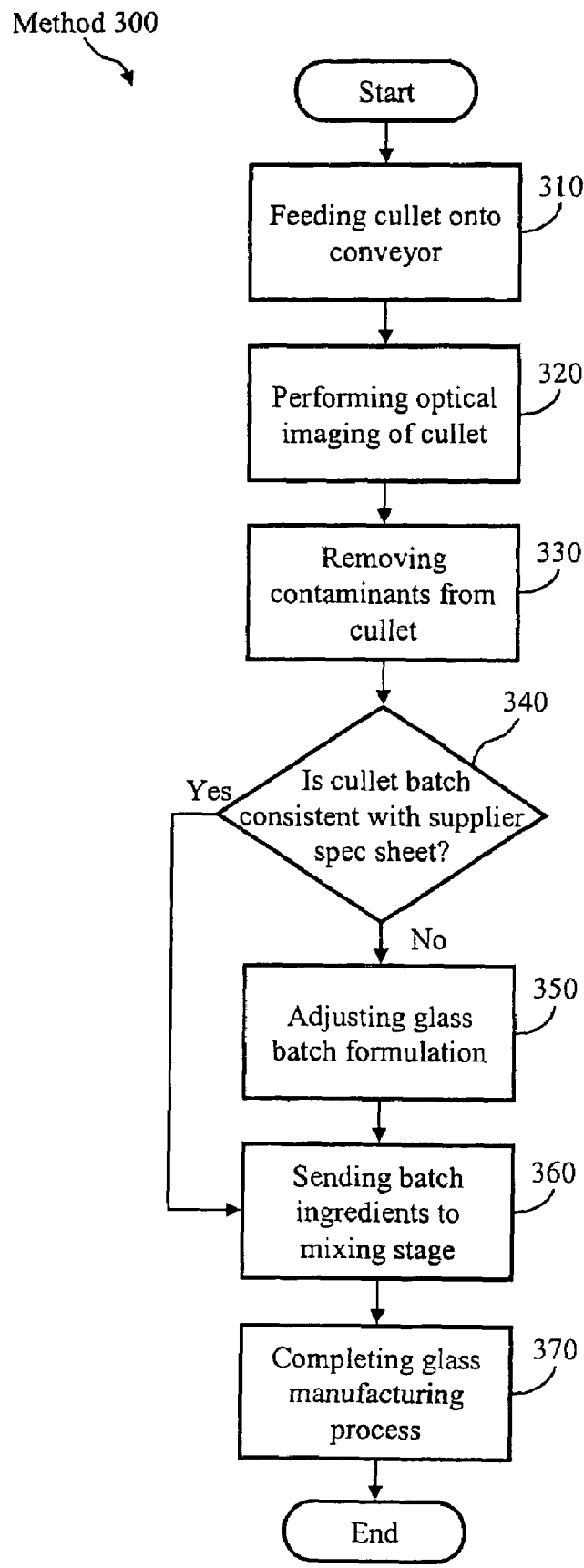
FIG. 3 illustrates a flow diagram of a method of imaging and cleaning mixed cullet, in accordance with the invention, to ensure uniformity and optimization of cullet quality for glass manufacturing.

Raw materials feeder 110 is representative of any device for handling, feeding, and analyzing the raw materials, in accordance with the invention and further described in more detail in reference to FIGS. 2 and 3. Raw materials contained within raw materials feeder 110 include a collection of typical raw materials for making glass, such as sand, soda ash, limestone, and nepheline syenite. In accordance with certain aspects of the invention, raw materials contained within raw materials feeder 110 further include some percentage of mixed color cullet, such as three-color mixed cullet containing flint, amber, and green glass.

Mixing stage 112 is representative of well-known mechanical mixers used in glass making for physically mixing the raw materials from raw materials feeder 110. Also added at this stage are minor colorant modifiers, e.g., colorizers and decolorizers, such as described in to U.S. Pat. No. 6,230,521, entitled, "Method of recycling batches of mixed color cullet into amber, green, or flint glass with selected properties."

Melting stage 114 is representative of a well-known melter or furnace apparatus for heating and thereby melting the raw materials after they are mixed within mixing stage 112. Within melting stage 114, the raw materials combine with each other, first in a solid state, then in a solid-liquid mixture, then in a complete liquid state. The resulting liquid is then homogenized because of the very high temperatures of typically between 1400° C. and 1600° C.

Bottle-forming stage 116 is the stage within glass manufacturing system 100 in which the end product is formed from the viscous liquid from melting stage 114 via a well-known glass blowing or press and blowing process, which is a process of forming glass hollow ware from molten glass by means of an "IS machine," which incorporates the necessary elements of pressing and/or blowing in a two stage process with appropriate molds, thereby forming a desired shape, such as a bottle shape.

Cooling/annealing stage 118 is the stage within glass manufacturing system 100 in which the end product, such as a bottle, is slowly cooled and annealed, which is the well-known process of reheating the glass to a temperature where strains are rapidly removed from the glass by viscous relaxation and then allowing it to cool at a slow, uniform rate, thereby preventing permanent strain from developing within the glass.

Inspection stage 120 is the stage within glass manufacturing system 100 in which the end product is inspected to determine whether it meets the expected quality and color specifications. For example, one inspection operation determines the mechanical integrity of the end product. In the case of bottles, the end product is inspected for bubbles and cracks. This is a bottle-to-bottle inspection event. A second operation determines whether the color specification is met by using a spectrophotometer to measure the percent transmission of the glass of each individual wavelength throughout the visible spectrum, i.e. about 400 to 700 nm wavelength. The profile of this measurement defines the color of the glass, which is then compared against an expected color specification. As color is something that changes slowly because of gradual changes in a batch, this is not a bottle-to-bottle inspection; instead, the color inspection is typically a periodic inspection, which at longer intervals, from hours to days depending on the variability of the batch.

Batch controller 122 is any conventional computer, such as a personal computer, laptop computer, or networked computer, which is loaded with control software used for storing and managing the glass formulation and mixing parameters of glass manufacturing system 100, thereby controlling the feed of raw materials from raw materials feeder 110 to mixing stage 112. The batch controller 122 may be a stand-alone computer from which batch formulation parameters are printed out and hand entered into the plant batch weigh-out and mixing equipment, or it may be electronically integrated with the plant batch weigh-out and mixing equipment. In highly integrated glass manufacturing facilities all functions may be integrated into the overall glass plant control computer network system.

The operation of the glass manufacturing system 100 of FIG. 1 is generally described as follows. Batch controller 122 determines the overall glass formulation, using typical raw materials for manufacturing glass based upon the end-product specification, such as the color specifications. In accordance with the invention, glass manufacturing system 100 performs batch analysis and optimization that is performed within raw materials feeder 110 in order to analyze the mixed cullet within the raw materials supply to determine conformity with the specifications listed in a batch formulation specification, or "spec" sheet provided to the glass manufacturer by the mixed cullet supplier. This batch analysis and optimization is further described in more detail in reference to FIGS. 2 and 3.

Subsequently, under the control of batch controller 122, the specific quantity of each raw material according to the batch formulation is fed at a predetermined rate from raw materials feeder 110 into mixing stage 112. Mixing stage 112 then physically mixes the raw materials as supplied from raw materials feeder 110 for a predetermined period of time before delivering the blended raw materials into melting stage 114.

Once mixing is complete, the blended raw materials are fed from mixing stage 112 into melting stage 114, in which the raw materials are heated to between 1400 and 1600° C. and combined with each other, first in a solid state, then in a solid-liquid mixture, then in a complete liquid state.

The molten raw materials then pass from melting stage 114 into bottle-forming stage 116, in which the end product is formed from the viscous liquid via the well-known glass blowing or press and blowing process, which is a process of forming glass hollow ware from molten glass by means of an "IS machine." Once the bottles are formed, they pass from bottle-forming stage 116 to cooling/annealing stage 118, in which the amber bottles are allowed to cool at a slow, uniform rate, thereby removing stress within the glass.

Inspection stage 120 is the stage within glass manufacturing system 100 in which the end product is inspected to determine whether it meets the expected quality and color specifications. Once the inspection process within inspection stage 120 is complete, those bottles that pass inspection, typically 88-94%, are bulk-packed and shipped to the end user. Conversely, those bottles that fail inspection, typically 6-12%, are crushed, thereby forming cullet, and returned to raw materials feeder 110.

FIG. 2 illustrates further elements within raw materials feeder 110 for performing batch analysis and optimization, in accordance with the invention. This batch analysis and optimization is performed in order to analyze mixed cullet to determine conformity with the specifications listed in a batch formulation specification, or spec sheet provided to the glass manufacturer by the mixed cullet supplier. As illustrated in FIG. 2, raw materials feeder 110 further includes a cullet bin 210, which contains a mixed cullet supply 220, a feeder 230, an optical imaging device 240, an air jet 250, and a raw materials supply 260. Also shown in FIG. 2 is batch controller 122, which is electrically connected to optical imaging device 240 and/or air jet 250 of raw materials feeder 110 via a conventional network link, such as an Ethernet link. Furthermore, FIG. 2 shows an outlet of feeder 230 feeding mixing stage 112 of glass manufacturing system 100 via a conveyor 270. Similarly, an outlet of raw material supply 260 feeds mixing stage 112 of glass manufacturing system 100.

Cullet bin 210 is an industrial sized silo or storage bin used for storing mixed cullet supply 220. Mixed cullet supply 220 may have any number of colored constituents including, but not limited, to flint, amber, and green glass. An exemplary three-color mixed cullet color distribution is approximately 55% flint (clear), 30% amber, and 15% green. Mixed cullet supply 220 may be composed of mixed, broken pieces of glass cleaned and processed by an MRF or cullet processor and supplied to glass manufacturing system 100. Feeder 230 is a conventional feeding mechanism, such as an electronic vibrating feeder, which feeds mixed cullet supply 220 upon a transport mechanism, such as a conveyor belt 270, which transports mixed cullet supply 220 through raw materials feeder 110. Optical imaging device 240 is a standard optical imaging device, such as a Compact Module from Binder and Co (Gleisdorf, Austria), used to image and analyze the composition of the glass fragments. Air jet 250 is a standard industrial air jet, which separates contaminants from mixed cullet supply 220 through the blowing of separate streams of air and which is incorporated into numerous available systems, such as the Binder system noted above. Batch controller 122 processes information obtained by optical imaging device 240 and compares the information with data supplied by a supplier's spec sheet. If the information obtained through the analysis of mixed cullet supply 220 using optical imaging device 240 does not match the information given on the spec sheet, batch controller 122 makes adjustments to the batch formulation to ensure that the end product is of consistent, uniform color and quality.

Raw materials supply 260 includes a collection of typical raw materials for making glass, such as sand, soda ash, limestone, and nepheline syenite; other additives, such as minor colorant modifiers; oxidizing agents, such as nitrates or sulfates; and reducing agents, such as coal. The raw materials from raw materials supply 260 typically have the consistency of beach sand. Raw materials supply 260 and mixed cullet supply 220 are both fed into mixing stage 112, within which these ingredients are combined.

In operation, mixed cullet supply 220 is fed from cullet bin 210 into feeder 230. Subsequently, mixed cullet supply 220 exits feeder 230 and is transported to mixing stage 112 via conveyor 270, which is representative of a standard conveyor belt system or any other conventional transport means. In one example arrangement, mixed cullet supply 220 subsequently falls from one section of conveyor 270, through some amount of free space, and onto a second section of conveyor 270. While mixed cullet supply 220 is falling through this free space, the optical imaging device 240, which is located in close proximity to the falling mixed cullet supply 220, performs image analysis of each particle of mixed cullet. Optical imaging device 240, which is linked to batch controller 122, transmits imaging data to batch controller 122, which analyzes the image data against spec sheet information provided by a supplier and stored therein. In doing so, batch controller 122 provides the glass manufacturer data about the composition of mixed cullet supply 220. In real-time, batch controller 122 compares for discrepancies between the image data from optical imaging device 240 and a desired tolerance threshold. Particularly, the tolerance threshold may include, but not limited to, allowable number or percentages of ceramic impurities, allowable percentage of "other colors" in a single color (pure) cullet supply, or allowable number or percentages of organic impurities. Thus, the tolerance threshold may be the cullet-supplier provided specification. Alternately, the tolerance threshold may be a preset or user-defined specification. Subsequently, batch controller 122 makes real-time adjustments to the batch formulation at mixing stage 112 such as, for example, by adding more copper oxide to the batch formulation to compensate for high levels of green cullet in the batch for amber glass. At the same time, batch controller 122, via the image data from optical imaging device 240, determines whether there are any contaminants, such as particles of ceramic, still present within mixed cullet supply 220. If so, batch controller 122 activates air jet 250, which is also located in close proximity to the falling mixed cullet supply 220, thereby removing by forced air any remaining contaminants in the stream of mixed cullet supply 220 and thus providing a final cleaning event of mixed cullet supply 220. Upon reaching the end of conveyor 270, mixed cullet supply 220 finally falls into mixing stage 112, where it combines with raw materials from raw material supply 260, which is simultaneously feeding mixing stage 112 of glass manufacturing system 100.

FIG. 3 illustrates a flow diagram of depicting imaging and cleaning of mixed cullet, in accordance with the invention, to ensure uniformity and optimization of cullet quality for glass manufacturing. Method 300 includes the following steps:

Step 310—Feeding cullet onto conveyor 270. In this step, mixed cullet supply 220 is fed from cullet bin 210 and onto conveyor 270 via feeder 230.

Step 320—Performing optical imaging of cullet. In this step, optical imaging of mixed cullet supply 220 by optical imaging device 240 occurs as it is transported along conveyor 270 to mixing stage 112. In one example arrangement, mixed cullet supply 220 falls from one section of conveyor 270, through some amount of free space, and onto a second section of conveyor 270. While mixed cullet supply 220 is falling through this free space, optical imaging device 240, which is located in close proximity to the falling mixed cullet supply 220, performs image analysis of each particle of mixed cullet. Optical imaging device 240, which is linked to batch controller 122, then transmits imaging data to batch controller 122. Optical imaging device 240 may be any number of devices capable of composition analysis. Thus, the scope of optical imaging device 240 encompasses devices capable of directly determining composition, for example using X-ray, infra-red, or Raman spectroscopy, or predictively determine composition by comparison of physical characteristics such as, but not limited to, optical opaqueness/transmission, color, size, shape, texture, aspect ratio, etc. As an example of analysis performed by such systems, a series of parametrically encoded images are stored in the computer memory of the optical imaging device 240 and the parameters of each particle of glass are compared electronically to these reference images and parameters. If a subject particle of material in the raw material stream conforms parametrically to known images of acceptable glass particles in memory, within statistically threshold ranges, the particle is accepted. If it parametrically falls outside the threshold range it is deemed an impurity and rejected from the stream at step 330. Still further, when integrated over several batches (for example, about 200 batches in a typical day), imaging data may provide an excellent predictive estimate or characterization of the cullet quality of, and/or composition from, particular cullet suppliers. This characterization may then be used as an overall quality control metric in selecting (or reselecting) cullet suppliers. Alternatively, the characterization could be used by the cullet supplier as a quality control metric in self-determining the quality of his cullet or as a comparison to the cullet of other suppliers.

Step 330—Removing contaminants from cullet. In this step, which occurs concurrently with step 320, batch controller 122, via the image data from optical imaging device 240, determines whether there are any contaminants, such as particles of ceramic, still present within mixed cullet supply 220. If so, batch controller 122 activates air jet 250, which is also located in close proximity to the falling mixed cullet supply 220, thereby removing by forced air any remaining contaminants in the stream of mixed cullet supply 220 and thus providing a final cleaning event of mixed cullet supply 220.

Step 340—A determination is made as to whether the cullet batch is consistent with the supplier spec sheet. In this step, it is determined whether the composition of mixed cullet supply 220 is consistent with the desired tolerance threshold, in this example, provided as the supplier spec sheet. More specifically, in a real-time operation, batch controller 112 compares the measured composition of mixed cullet supply 220, as determined by optical imaging device 240, against the spec sheet information provided by the supplier and identifies any discrepancies between them. If the composition compares favorably (yes), the method proceeds to step 360. If the composition does not compare favorably (no), the method proceeds to step 350.

Step 350—Determining a glass batch formulation: In this step, batch controller 122 determines in real-time what overall glass batch formulation is required to produce an end product having certain desired characteristics. Thus, quantities of raw materials from raw materials supply 260, are added accordingly. Further, batch controller 122 may determine what adjustments are needed to a predetermined glass batch formulation to compensate for discrepancies between the measured composition of mixed cullet supply 220 and an expected composition. The quantities of all ingredients, including both mixed cullet supply 220 and raw materials from raw materials supply 260, are adjusted accordingly. An example of real-time adjustment is adding more copper oxide to the batch formulation if higher than expected levels of green glass are found, or adding higher amounts of iron oxide and chemical reducing agents, such as coal, if higher then expected levels of flint glass are found. Still further, in certain instances, off-color or unexpected glass, e.g. dark violet blue, can be rejected from the stream as an impurity. As a further example, and as described in U.S. Pat. No. 6,230,521, a computer-controlled process may automatically determine, the proper amounts of raw materials to add to the batch of mixed colored cullet so that recycled glass is produced that has the desired coloring oxides, redox agents, and glass structural oxides in the proper proportion.

Step 360—Sending batch ingredients to mixing stage. In this step, mixed cullet supply 220 and raw materials from raw materials supply 260 are simultaneously fed into mixing stage 112 of glass manufacturing system 100 in specific quantities, as calculated or adjusted in step 350. All ingredients are subsequently blended within mixing stage 112 to physically create the glass batch formulation as determined, or adjusted, in Step 350.

Step 370—Completing glass manufacturing process. In this step, the blended raw materials are fed from mixing stage 112 into melting stage 114, in which the raw materials combine with each other, first in a solid state, then in a solid-liquid mixture, then in a complete liquid state at typically between 1400 and 1600° C. Subsequently, the molten raw materials are fed into bottle-forming stage 116, in which the end product is formed from the viscous liquid via the well-known glass blowing process. Subsequently, the glass product passes into cooling/annealing stage 118, in which the glass product is allowed to cool at a slow, uniform rate, thereby removing stress within the glass. Finally, the glass product passes into inspection stage 120 for a final quality inspection.

The scope of the invention also includes a program storage device readable by a processor and storing thereon a program of instructions executable by the processor during the process of creating recycled glass products of a particular color from mixed color glass cullet having glass of at least two different colors. In accordance with the invention, the program of instructions causes the processor to accept as inputs a designation of virgin glass raw materials, a designation of the particular color of the recycled glass products, a designation of desired transmission properties of the recycled glass products of the particular color, a designation of how much of the mixed color glass cullet, by weight percent, is to be melted as a fraction of a recycled finished glass from which the recycled glass products are to be created and causes the processor to continually determine, from the real-time determination of cullet constituents, the amounts of virgin glass raw materials, glass coloring agent levels and key glass indicator parameters of glass of the particular color with the specified transmission properties, and a composition of the recycled finished glass. The program of instructions further causing the processor to output, either to a screen or printer, an indication of the composition for use in the process of creating recycled glass products of a particular color from mixed color glass cullet, the composition including weight percentages of the raw materials, the mixed color glass cullet, the key glass indicator parameters, and the glass coloring agent levels.

In summary, certain preferred embodiments the present invention include a glass manufacturing system and method utilizing an optical imaging device 240, which is linked to batch controller 122, to provide optical imaging analysis of mixed cullet supply 220. Batch controller 122 compares the measured composition of mixed cullet supply 220 with a desired tolerance threshold and makes any necessary real-time adjustments to the batch formulation to ensure that the end product is of consistent, uniform color and quality. Furthermore, glass manufacturing system 100 and method 300 allow for a final cleaning of mixed cullet supply 220 to eliminate any residual contaminants, thereby further enhancing the quality of mixed cullet supply 220.

The invention having been disclosed in connection with the foregoing variations and examples, additional variations will now be apparent to persons skilled in the art. The invention is not intended to be limited to the variations and examples specifically mentioned, and accordingly reference should be made to the appended claims to assess the spirit and scope of the invention in which exclusive rights are claimed.

What is claimed:

1. A method of creating recycled glass products comprising:
    providing a supply of mixed-color glass cullet to a conveyor;
    determining constituents of said glass cullet as it moves along said conveyor, prior to providing said glass cullet to a mixer;
    comparing the determined composition of said glass cullet constituents to a desired tolerance threshold;
    if the composition of the determined glass cullet constituents exceeds said desired tolerance threshold, adjusting, in real-time, a glass batch formulation based on at least the determined glass cullet constituents;
    mixing the glass cullet with raw materials in said mixer including any additional raw materials provided in accordance with said adjusted said glass batch formulation; and
    producing at least one recycled glass product from said adjusted glass batch formulation.

2. The method of claim 1, further comprising selectively diverting at least one of said constituents from said conveyor which do not satisfy said tolerance threshold prior to mixing.

3. The method of claim 2, wherein said diverting is performed by an air jet device.

4. The method of claim 1, wherein determining constituents comprises analyzing with a device capable of measuring at least one of composition and color of said glass cullet.

5. The method of claim 4, wherein said device comprises an optical imaging device.

6. The method of claim 4, wherein said device comprises an X-ray spectroscopy device.

7. The method of claim 4, wherein said device comprises at least one of an infra-red and a Raman spectroscopy device.

8. The method of claim 4, wherein said device comprises a device capable of measuring at least one of optical transmission properties and optical reflectivity properties of said glass cullet.

9. The method of claim 1, wherein said mixed-color glass cullet comprises at least one of amber, green and flint glass.

10. A method as in claim 1, wherein the tolerance threshold is determined from a specification provided by a cullet supplier.

11. A method as in claim 1, wherein the tolerance threshold is determined from at least one of a preset and a user-determined specification.

12. A method as in claim 1, wherein the determination of constituents of said glass cullet is used as a quality control metric.

13. The method of claim 1, wherein adjusting the glass batch formulation comprises adjusting a predetermined glass batch formulation based on at least said determined glass constituents.

14. The method of claim 1, wherein said recycled glass product is a beer bottle.

15. A glass cullet processing system comprising:
    a conveyor suitable to convey mixed-color glass cullet;
    a feeder for feeding a supply of mixed-color glass cullet to said conveyor;
    an analyzer capable of determining at least one of composition and color of said glass cullet as the glass cullet passes said analyzer on said conveyor;
    a batch controller that determines, based on at least an output of the analyzer, if a determined composition or determined color of said glass cullet exceeds a desired tolerance threshold for a desired glass composition and, if so, adjusting, in real-time, at least one glass batch formulation based on at least the-output of the analyzer; and
    a mixer that mixes the glass cullet with raw materials including any additional raw materials provided in accordance with the adjusted glass batch formulation.

16. The system of claim 15, wherein the mixed-color glass cullet comprises at least one of amber, green and flint glass.

17. The system of claim 15, further comprising a diverting device that selectively diverts at least one constituent or contaminant of said cullet so as to bring the conveyed glass cullet into compliance with said desired tolerance threshold for said desired glass composition.

18. The system of claim 17, wherein said diverting device is an air jet device.

19. The system of claim 15, wherein said analyzer comprises an optical imaging device.

20. The system of claim 15, wherein said analyzer comprises an X-ray spectroscopy device.

21. The system of claim 15, wherein said analyzer comprises at least one of an infra-red and a Raman spectroscopy device.

22. The system of claim 15, wherein said analyzer comprises a device capable of measuring at least one of optical transmission properties and optical reflectivity properties of said glass cullet.

23. The system of claim 15, wherein said batch controller compares the output of the analyzer to said desired tolerance threshold.

24. The system of claim 17, wherein said batch controller determines those constituents not in compliance with said desired tolerance threshold and sends control signals to said diverting device.

25. The system of claim 23, wherein said desired tolerance threshold is determined from a specification provided by a cullet supplier.

26. The system of claim 23, wherein said desired tolerance threshold is determined from at least one of a preset and a user-determined specification.

27. A method of creating recycled glass products comprising:
providing a supply of mixed-color glass cullet to a conveyor;
determining constituents of said glass cullet as it moves along said conveyor, prior to providing said glass cullet to a mixer;
comparing the determined composition of said glass cullet constituents to a desired tolerance threshold;
selectively diverting, as said glass cullet moves along said conveyor to said mixer, at least one of glass constituents or impurity constituents from said conveyor which do not satisfy said desired tolerance threshold;
mixing the glass cullet with raw materials in said mixer; and
creating at least one recycled glass product from said mixed glass cullet and raw materials.

28. The method of claim 27, wherein said glass cullet comprises at least one of amber, green and flint glass.

29. The method of claim 27, wherein determining constituents of said glass cullet comprises analyzing with a device capable of measuring at least one of composition and color of said glass cullet.

30. The method of claim 29, wherein said device comprises an optical imaging device.

31. The method of claim 29, wherein said device comprises an X-ray spectroscopy device.

32. The method of claim 29, wherein said device comprises at least one of an infra-red and a Raman spectroscopy device.

33. The method of claim 29, wherein said device comprises a device capable of measuring at least one of optical transmission properties and optical reflectivity properties of said glass cullet.

34. The method of claim 27, wherein said diverting is performed by an air jet device.

35. The method of claim 27, wherein said desired tolerance threshold is determined from a specification provided by a cullet supplier.

36. The method of claim 27, wherein said desired tolerance threshold is determined from at least one of a preset and a user-determined specification.

37. The method of claim 27, wherein determination of constituents of said glass cullet is used as a quality control metric.

38. The method of claim 27, further comprising determining a glass batch formulation based on at least the determined glass cullet constituents.

39. The method of claim 38, wherein determining the glass batch formulation comprises adjusting a predetermined glass batch formulation based on at least said determined glass constituents.

40. The method of claim 27, wherein said recycled glass product is a beer bottle.

* * * * *